United States Patent [19]
Ihms

[11] 3,846,810
[45] Nov. 5, 1974

[54] APPARATUS FOR STEROSCOPIC PHOTOGRAPHY

[76] Inventor: James Ernest Ihms, 1569 W. Hazelwood, Phoenix, Ariz. 85015

[22] Filed: July 2, 1973

[21] Appl. No.: 375,335

[52] U.S. Cl. ............................................. 354/117
[51] Int. Cl. ......................................... G03b 35/12
[58] Field of Search ................... 95/18; 352/57, 60; 354/117

[56] References Cited
UNITED STATES PATENTS
2,301,254  11/1942  Carnahan........................... 178/6.5
2,568,327  9/1951  Dudley................................ 95/18
2,751,826  6/1956  Harrison.............................. 95/18

Primary Examiner—John M. Horan
Attorney, Agent, or Firm—Cahill, Sutton & Thomas

[57] ABSTRACT

Photographic apparatus for use in conjunction with a camera to produce a composite image of a scene, which image includes sufficient information to provide a three dimensional view of the scene.

2 Claims, 9 Drawing Figures

PATENTED NOV 5 1974 3,846,810

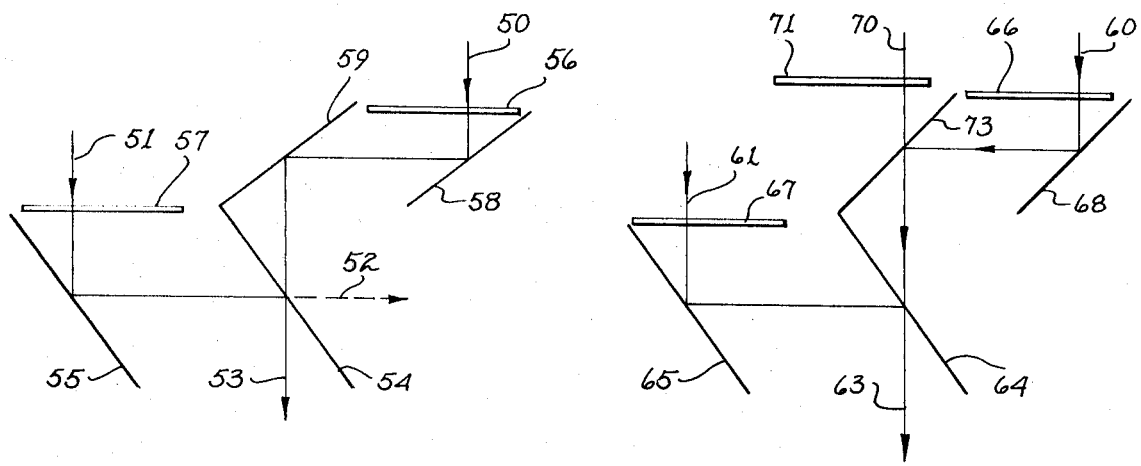
fig. 6
fig. 7
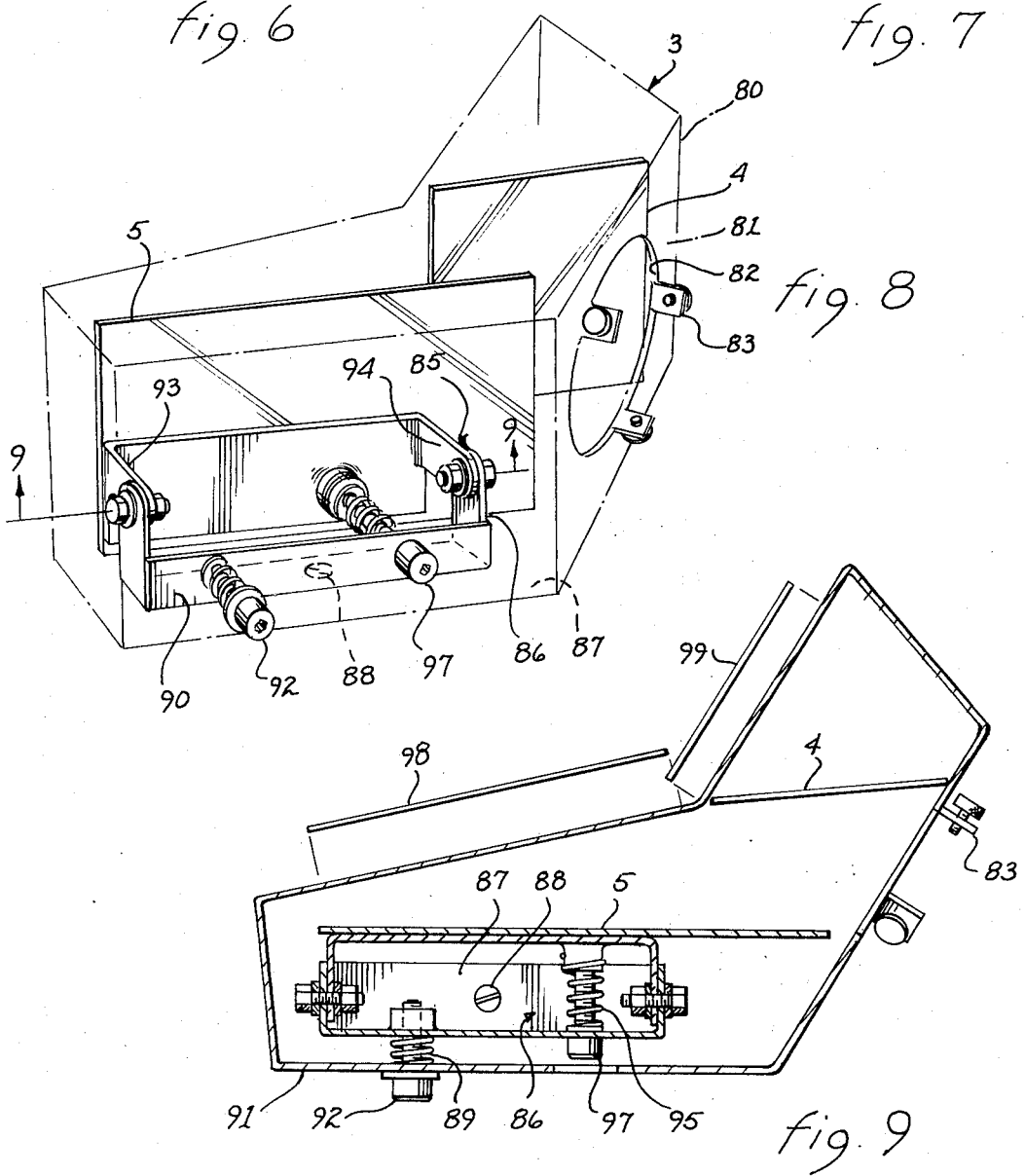
fig. 8
fig. 9

APPARATUS FOR STEROSCOPIC PHOTOGRAPHY

The present invention relates to three dimensional photography, and, more particularly, to apparatus attached to a camera for obtaining a single photographically recorded composite image containing the requisite information content to produce a three dimensional view of the scene photographed.

Stereoscopic photography has had cyclical public appeal since approximately 1839 when the first stereo photographs were made. The stereo concept employed can be traced to thoughts first propounded by Leonardo de Vinci in 1584. The advances since 1839 have been essentially limited to improvements in equipment resulting in greater registration, better optics and improved projection systems. Despite the amount of work done and the many improvements generated, no significant change in the photographic compillation of the final product has been developed. That is, the method for effecting stereo photography has remained the same.

Stereo photography may be described as follows. Two laterally displaced essentially simultaneously exposed negatives, positives, or impressions in the case of television, are taken of a scene. For best real life simulation, the lateral displacement should be equivalent to the distance between the viewer's eyes. The negatives, positives, or impressions are viewed through a stereo opticon device, which device permits each eye to see only one of the negatives or prints. The image seen by each eye is slightly different because of the lateral displacement and hence, each image is formed along one of two slightly different lines of sight. This difference is translated by the brain into a sense of depth.

Where the physical separation provided by a stereo opticon is not feasible, othe image separation techniques have been used. In example, when the two images are superimposed upon a common medium, such as in a movie or on a print, optical rather than physical separation must be used. The separation may be effected by projecting one image in a red color and the other image in a green color. Each of the two images are projected onto a common screen as in the case of a movie. In the case of the printing medium, each image would be printed in a different color, such as red and green. The composite image is viewed by placing a different filter in front of each eye. The filters, usually being mutually exclusive, permit each eye to see only the scene as photographed by one of the lenses. As each eye sees the scene photographed by the corresponding lens, each eye sees the same scene along a slightly different line of sight. The discrepancy is translated by the brain to provide a sense of depth and hence, provides a three dimensional effect to the scene photographed.

Because of the requirement of double negatives in early stereoscopic photography, various devices have been developed to portray the necessary information on a single negative. U.S. Pat. No. 2,639,653 illustrates apparatus using a rotatable disc or sliding diaphragm adjacent to the objective lens to obtain slightly different views of the same scene. A specially constructed viewing device displays one of the views to each eye of the observer. Thus, a stereoscopic effect is achieved. In U.S. Pat. No. 2,317,875, a plurality of rectangular prisms are employed to form a plurality of picture strips, each strip conveying a part of the picture. Alternative ones of the strips form the total picture seen through one lens system. The remaining strips form the total picture seen through another lens system. The stereoscopic effect is obtained by viewing the strip composite through a special viewer, which viewer segregates one set of strips to one eye and the other set of strips to the other eye. A recent U.S. Pat. No. 3,712,199, teaches apparatus for producing an image to provide a psychophysiological illusion of depth. This system, contrary to most stereoscopic systems, does not capture two laterally displaced images. Instead, a single line of sight of the object photographed is employed. Within the lens system itself, one half of the rays are filtered by a first filter while the second half of the rays are filtered through a second filter. The composite image is viewed through glasses having corresponding filters. Thus, one eye of the viewer is capable of detecting that portion of the composite image seen through one half of the lens system while the other eye sees only the other half of the image passed through the lens system. As there is no initial lateral separation of the two images, the composite is not a true three dimensional image but appears to create the illusion of a three dimensional image. It may be noted that none of the above described apparatus are capable of recording and superimposing the two images simultaneously where the two images are laterally displaced.

Other U.S. patents directed to various three dimensional photographic apparatus include: Nos. 475,084; 1,595,984; 2,043,119; 2,386,413; 2,749,820; 2,895,374; and 3,642,349.

It is therefore a primary object of the present invention to provide apparatus for producing a three dimensional image of a scene.

Another object of the present invention is to provide apparatus for simultaneously superimposing two different color content images of the same scene taken along different lines of sight.

Still another object of the present invention is to provide apparatus for decoding a composite image to produce a three dimensional view of an object.

Yet another object of the present invention is to provide a dual input aperture filter system for cameras, which filter system does not noticeably degrade the amount of light transmitted to the light sensitive medium.

A further object of the present invention is to provide a means for combining two views along different lines of sight of the same object to produce a composite image.

A yet further object of the present invention is to provide apparatus for focusing and aligning two different views of the same object upon a common light sensitive medium.

These and other objects of the present invention will become apparent to those skilled in the art as the description thereof proceeds.

The present invention may be described with more specificity and clarity with reference to the following figures, in which:

FIG. 6 illustrates a modification of the filtering system shown in FIG. 5.

FIG. 7 illustrates a modification of the filtering system shown in FIG. 6.

FIG. 8 illustrates a perspective view of the focusing and alignment apparatus of the present invention.

FIG. 9 illustrates a cross-sectional view of the apparatus taken along lines 9—9, as shown in FIG. 8.

The appearance of three dimensionality in images can be created by superimposing two views of the same scene. If the two views are laterally displaced from one another by an amount approximately equal to the distance between a viewer's eyes, the resulting image will have essentially the same three dimensional appearance as if the viewer were seeing the scene personally. Where the separation is greater than that between the viewer's eyes, the three dimensional effect is exaggerated. Similarly, if the distance is less, the three dimensional effect is minimized. The composite is in register at the point where the two lines of sight cross one another. Those elements of the scene being closer or further away, will be out of register. This situation is similar to that which occurs in real life. The degree of out-of-register is dependent upon the distance between the viewing point and the element in register.

Figure 1:
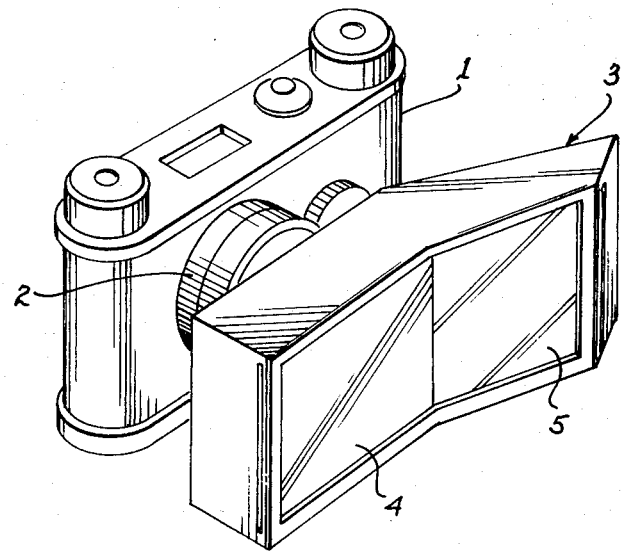
FIG. 1 illustrates the present invention attached to the lens of a camera.

Referring to FIG. 1, there is shown apparatus incorporating the present invention and used in conjunction with a camera for obtaining a composite image of a scene, which scene is viewed along two different lines of sight. Camera 1, which may be a highly complex instrument or a very simple camera, such as those cameras sold by the Eastman Kodak Company under the trademark "Instamatic," includes a lens system 2. A housing 3 is detachably secured to a lens system 2. The exact means and mode of attaching the housing may, of course, be varied to suit the lens system.

Housing 3 includes a light transmissive element 4, which element may be a dichroic mirror, neutral beam splitter, or a prism and a light reflective element 5, such as a mirror. The distance between the centers of elements 4 and 5 is approximately two and one half inches, or, the average distance between a person's pupils. For special needs or effects, the distance may be increased or decreased.

In the following description, the lower end of the visible spectrum of light will be collectively identified by the term "cyan light rays." Similarly, the upper end of the spectrum of visible light rays will be identified as the "red-orange light rays." Stated another way, light rays from a white light source are changed in color and/or tone content when passed through a red-orange filter; similarly, the light rays from a white light source are changed in color and/or tone content when passed through a cyan filter. As a result, each filter produces a different color content image.

Figure 2:
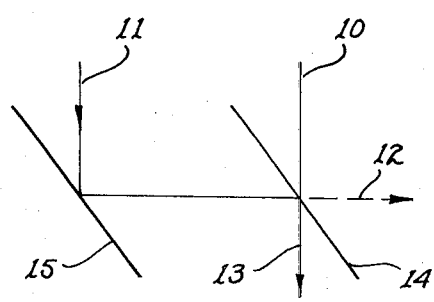
FIG. 2 illustrates the basic filtering and image combining system of the present invention.

The light paths within housing 3 are shown schematically in FIG. 2. A first light ray 10 emanating from an object to be photographed is received by and at least partially passed through light transmissive element 14. If light transmissive element 14 is a red-orange transmitting and cyan reflecting dichroic mirror, it will act like a mirror to the cyan light rays. The reflected cyan light rays is indicated by arrow 12. The transmitted light will be composed of essentially the red-orange light rays. The transmitted light forms a part of the bundle of light rays identified as composite ray 13.

Light ray 11 represents another plurality of light rays emanating from the same object producing light ray 10. However, light ray 11 is laterally displaced from light ray 10, which displacement results in some difference of light content between the two rays. The totality of light ray 11, except for reflection losses, is reflected by light reflective element 15 to dichroic filter 14. The dichroic filter 14 will reflect the cyan light rays but permit transmission therethrough of the red-orange light rays contained within light ray 11. The composite light ray 13 is then a combination of the red-orange light rays within light ray 10 and the cyan light rays within light ray 11.

The information content of light ray 13 includes sufficient information to show the object from two dissimilar views. The first view is formed by the red-orange light rays from light ray 10 and the second image is formed by the cyan light rays from light ray 11. These two images are superimposed upon one another on the photographic recording medium within camera 1.

The illumination provided by each of light rays 10 and 11 is diminished by the dichroic filter 14. However, as the red-orange light rays are filtered from one of the incoming light rays and the cyan light rays are filtered from the other incoming light ray, the composite light ray 13 includes essentially the same illumination as either of light rays 10 or 11. Thus, the aperture or speed of the lens system 2 of camera 1 using the present invention may not need to be adjusted to accomodate the filtering of the incoming light rays.

If the photographic recording medium within the camera is color film (either negative or positive) and is exposed by composite light ray 13 it will respond to the composite light ray and record both images thereon. The images will be essentially in registration and the resulting positive or print will be of acceptable quality for general viewing purposes. When the positive is projected onto a screen for viewing or when a print of the negative or positive is viewed, the viewer may or may not obtain a sensation of third dimensionality. If the sensitivity of the viewer's eyes are mis-matched where one eye is more responsive to the red-orange rays than the other, a sense of three dimensionality will be readily apparent. To obtain the full effect of a third dimension of the photographed object, the viewer should don a pair of glasses having a cyan lens and a red-orange lens. The red-orange lens should be used in front of the eye corresponding to light ray 10 while the cyan lens should be used in front of the eye corresponding to the light ray 11. With this arrangement, one of the viewer's eyes will see the object as conveyed by light ray 10 and the other eye will see the object as conveyed by light ray 11. As each eye sees the object from a different vantage point, the object will appear to be in three dimensions. That is, the composite image will have depth.

From the above description, it may be understood that the present invention incorporates a dual light ray input where each light ray corresponds to a slightly displaced viewpoint of the object. Secondly, the color of the light rays is modified prior to the combining of the two images. Thirdly, the input from each of the two light rays are simultaneously recorded as separate images upon the color sensitive photographic recording medium.

Figure 3:
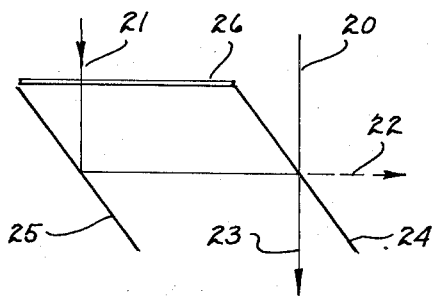
FIG. 3 illustrates a filter used in conjunction with the filtering system shown in FIG. 2.

Referring to FIG. 3, there is shown a pair of light rays 20 and 21 angularly displaced but emanating from the same object. The light transmissive element 24 is a beam splitter for reflecting one half of light ray 20 impinging thereupon. Thus, half of light ray 20 is passed through element 24 while the remainder is reflected along path 22. Light ray 21 passes through a filter 26, which filter may be either a red-orange or cyan filter. If filter 26 is red-orange, the portion of light ray 21 passing therethrough will then contain only the red-orange rays emanating from the object and will be reflected by light reflecting element 25 to element 24 and become a part of light ray 23 and be carried through the lens system into the camera. The content of light ray 23 will be a composite of half of the filtered rays contained within light ray 21 and half of the white light contained within light ray 20. Thus light ray 23 contains sufficient information to form a pair of images, each corresponding to the information contained by one of the incoming light rays.

When light ray 23 impinges upon a color sensitive medium, such as a color positive or print, a composite of the two superimposed images will be formed simultaneously. The two images are segregable if the composite is viewed through a pair of glasses having a red-orange filter for one lens and a cyan filter for the other lens. The orientation of the filters must match the orientation of rays 21 and 20. One of the viewer's eyes will see the image conveyed by light ray 21 while the other eye will see the image conveyed by light ray 20. The somewhat different images will be converted by the viewer's brain to provide a sense of three dimensionality to the image.

The totality of illumination provided by light ray 23 is essentially equal to that of either ray 20 or 21 before the latter are acted upon by the apparatus of the present invention. This results because approximately fifty percent of light ray 20 is reflected. If it is assumed that the object under inspection is composed of approximately equal parts of the lower and upper light spectrum, approximately fifty percent of the illumination of ray 21 is eliminated by filter 26. Thus, each light ray 20 and 21 contributes approximately fifty percent illumination to ray 23. Thereby, the aperture or speed of the lens system of the camera need not be adjusted to compensate for light attenuation by the beam splitter and filter.

Figure 4:
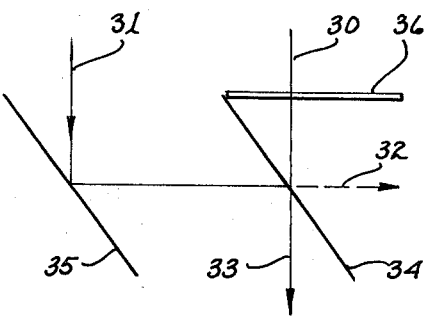
FIG. 4 illustrates a modification of the filtering system shown in FIG. 3.

Referring to FIG. 4, there is shown a modification of the present invention described with respect to FIG. 3. Herein, the light ray 30, directly impinging upon a beam splitter 34, is filtered by either a red-orange or a cyan filter 36. The non-reflected, but filtered part of light ray 30 forms a portion of composite light ray 33. The reflected part of filtered light ray 30 is depicted by ray 32. Ray 31, reflected from the same object as light ray 30 but angularly displaced therefrom is reflected by reflecting element 35 to beam splitter 34. Light ray 31 is again reflected by beam splitter 31 and forms the remaining part of composite ray 33.

Composite ray 33 thus contains two sets of information representative of two simultaneous views of the object. One set of information has been filtered by filter 36 while the other set of information is mechanically non-filtered.

Composite ray 33 is recorded upon color sensitive film to produce a composite image. The two images, when viewed, are segregated by means of a pair of filtered glasses as described above. Thus, each eye of the viewer will receive the information content of one of light rays 30 or 31.

The total illumination of light ray 33 may be somewhat greater than the total illumination of either of rays 30 or 31. This result occurs because ray 31, except for reflection losses, is essentially contained within composite 33. Ray 30 has been diminished in illumination first by filter 36 and secondly by the reflected portion represented by path 32. In addition, the color segregation may not be quite as distinct as available with the apparatus shown in FIGS. 2 and 3.

Figure 5:
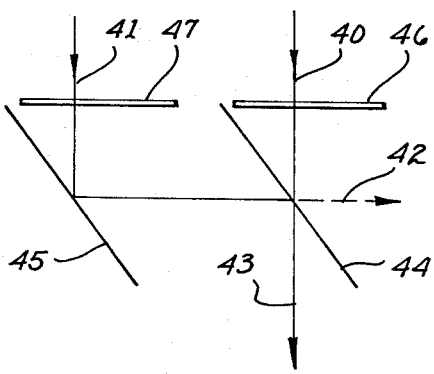
FIG. 5 illustrates a pair of filters used in conjunction with the filtering system shown in FIG. 2.

Referring to FIG. 5, there is shown a modification of the apparatus described with respect to FIG. 2. Each of beams 40 and 41 are filtered by filters 46 and 47, respectively. The addition of these filters delimits the color contribution of each of the light rays 40 and 41 to composite light ray 43 to a more precise extent than the apparatus shown in FIG. 2. Thus, the discarded light rays represented by path 42 are also better defined.

The addition of filters 46 and 47 provides the capability of more accurately defining the color content of the contribution of each of light rays 40 and 41. These filters may also be used to compensate for any color atenuation that may occur because of low sensitivity to certain wave lengths of the color sensitive medium within the camera.

In the apparatus described with respect to FIGS. 2–5, there is a difference in path length of the light rays of pairs of light rays 10–11, 20–21, 30–31 and 40–41. Such a path length difference may or may not affect the color content of the composite light ray. In FIG. 6 there is shown apparatus for providing an equal path length for each of the rays 50 and 51. The previously non-reflected and transmitted light ray has now been reflected by two additional elements, 58 and 59. The orientation and disposition of these elements are intended to duplicate the distance between light transmissive element 54 and reflective element 55.

Filters 56 and 57 may be disposed within the paths of light rays 50 and 51, respectively, if the apparatus of FIG. 5 is to be employed. Alternatively, one or both of filters 56 and 57 may be used as shown in FIGS. 3 and 4, or, they may be deleted as shown in FIG. 2. The operation of the apparatus shown in FIG. 6 has been described above and need not be described in further detail.

The apparatus shown in FIG. 7 teaches the contribution of a third light ray 70 spacially disposed intermediate light rays 60 and 61 in the apparatus shown in FIG. 6. The path length of light ray 70 is equalized with that of beams 60 and 61 by the inclusion of an auxiliary lens 71. Elements 73 and 64 may be beam splitters or dichroic lenses depending upon the light reflective and light transmissive system employed. Light ray 61 may be filtered by filter 67 and reflected by reflective element 65 and reflective/transmissive element 64, the latter reflecting at least a poriton of light ray 61 to the color sensitive medium. Similarly, light ray 60 may be filtered by filter 66 and reflected by reflecting elements 68 and 73 and transmitted through reflective/transmissive element 64 to the color sensitive medium. Ray 63 is representative of the contribution to the color sensitive medium by each one of the three rays, 60, 61 and 70.

With the apparatus shown in FIG. 7, light ray 70 defines the major part of the image sensed by the color sensitive medium. Light rays 60 and 61 contribute additional information to the composite image, which information is representative of the object when viewed from each of two angularly displaced points. Thus, ray 70 provides the major information content and rays 60 and 61 provide the necessary shadings and/or color gradations to the image to provide a quality of three dimensionality to the image. The decoding of the image to obtain the three dimensional effect would be performed in accordance with the apparatus discussed above.

The housing 3 is shown in further detail in FIGS. 8 and 9. It is formed by a housing 80 containing the various previously discussed light transmissive and light reflective elements as well as the various filters when the latter are employed. An aperture 82 is disposed in the rear surface 81 to receive the lens system of a camera. Retaining elements, representatively shown and identified by numeral 83 secure the housing 3 to the lens system. It is to be understood that the retaining means 83 may be varied to suit particular applications.

The light transmissive element (identified in FIGS. 2-7 as element 14, 24, 34, 44, 54 and 64, respectively) is normally firmly lodged within housing 30 to intersect the viewing angle of the lens system 2. The reflecting element 5 (identified in FIGS. 2-7 as elements 15, 25, 35, 45, 55, and 65, respectively) is normally pivotably mounted within housing 80 by mounting mechanism 85. It is to be understood that elements 4 and 5 could be permanently, removably or adjustably mounted within housing 3.

The mounting mechanism 85 may be formed by a yoke 86 pivotally secured to base 87 at pivot point 88. A spring biased adjustment screw mechanism 89 is disposed intermediate a flange 90 extending upwardly from the base of yoke 86 and side 91 of housing 80. As is well known to those skilled in the art, the turning of screw 92 will cause yoke 86 to pivot about its pivot point 88. Thus, adjustment mechanism 89 may be used to obtain registration between the two received images.

The rear surface of reflecting element 5 includes a pair of flanges 93 and 94 extending rearwardly therefrom and forming a part of mounting mechanism 85. Each of these flanges is pivotally mounted upon one of the arms of yoke 86. A second adjustment mechanism 95 may be disposed intermediate flange 90 extending from the base of yoke 86 and the rear surface of reflecting element 5. By turning the screw 97 of the adjustment mechanism 95, reflecting surface 5 pivots about the pivot point intermediate flanges 93 and 94 and the arms of yoke 86. In this manner, vertical alignment of the reflected element 4 with respect to the transmissive element 4 may be obtained.

The previously discussed filters may be configured to mate with the front of housing 3, as shown in FIG. 9. A first filter 99 is disposed across the light ray path striking transmissive element 4 without also impeding upon the light ray striking element 5. Similarly, a second filter 98 is secured to the front of housing 3 to intercept the light ray path striking reflective element 5 without also impeding upon the light ray striking transmissive element 4.

The present invention may also be used as a decoder to permit a person to view the positives or color prints without the need of specially filtered glasses and yet obtain the effect of a three dimensional image. If a person holds the housing 3 in front of his eyes so that light transmissive element 5 is in front of one eye and light reflective element 4 is in front of the other eye, and light from the positive or print enters through aperture 82, the housing will segregate the two images. One eye will receive one image while the other eye receives the other image. As discussed above, the person's brain will attribute a sense of three dimensionality to image viewed because of the two similar but not identical images.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. Apparatus for forming a composite image of a given object upon an image recording medium by simultaneously combining a first white light image of the object with a second white light image of the object where said first and second images are angularly displaced from one another, said apparatus comprising:
   a. a light reflecting element for reflecting said first image along a light path to intersect the light path of said second image;
   b. a light transmissive element disposed at the intersection of said reflected first image and said second image;
   c. said transmissive element including a dichroic mirror having a first planar surface set at an angle with respect to the light path of said first reflected image for receiving the totality of said first reflected image and a second planar surface parallel to said first planar surface and set at an angle with respect to the light path of said second image for receiving the totality of said second reflected image such that said first reflected image and said second image enter said transmissive element at opposite sides thereof, said further reflected portions of said reflected first image in combination with said non-reflected portions of said second image forming said composite image;
   d. filter means for altering the content of only one of said first and second white light images; and
   e. said image recording medium being disposed in the path of said composite image; whereby, said recorded composite image includes said simultaneously received first and second images, each of said first and second images having a full spectrum of color content and portraying two different views of the same object.

2. The apparatus as set forth in claim 1 wherein said dichroic mirror reflects light rays within the lower end of the visible spectrum of light and transmits light rays within the upper end of the visible spectrum of light.

* * * * *